June 6, 1972
J. R. SETINA
3,667,801
AUTOMOBILE PARTITION APPARATUS HAVING HORIZONTAL
SLIDING WINDOW PORTION MOUNTED ON GUARD PLATE
Filed Dec. 18, 1969
2 Sheets-Sheet 1
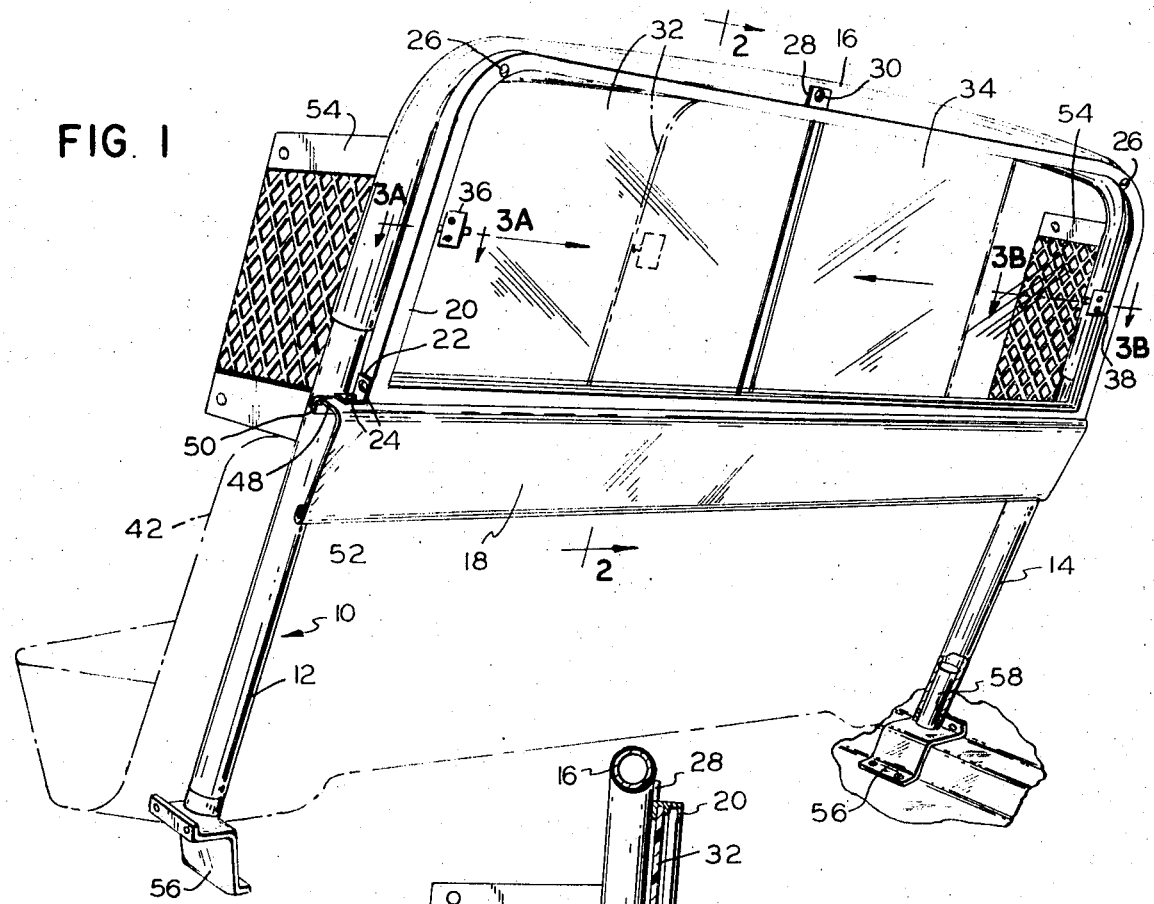
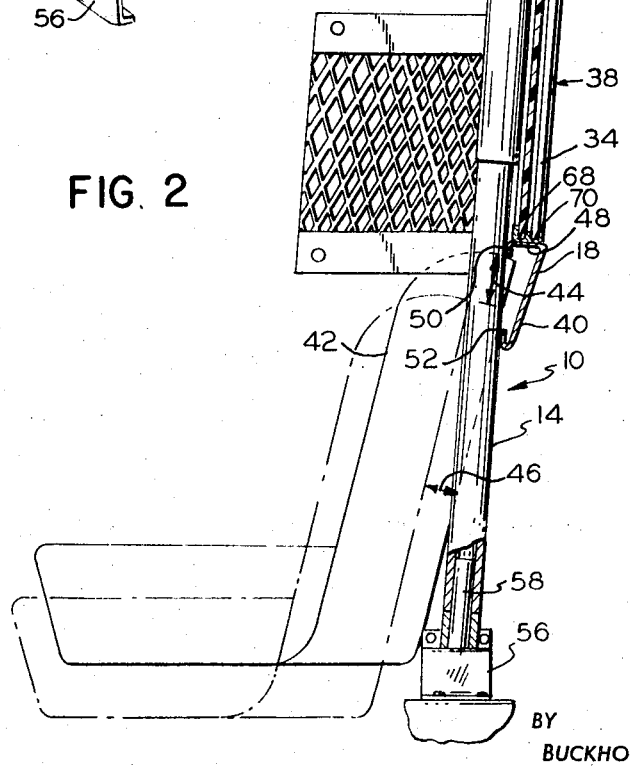
JOHN R. SETINA
INVENTOR
BY
BUCKHORN, BLORE, KLARQUIST & SPARKMAN
ATTORNEYS June 6, 1972　　　J. R. SETINA　　　3,667,801
AUTOMOBILE PARTITION APPARATUS HAVING HORIZONTAL
SLIDING WINDOW PORTION MOUNTED ON GUARD PLATE
Filed Dec. 18, 1969　　　2 Sheets-Sheet 2

JOHN R. SETINA
INVENTOR

BY
BUCKHORN, BLORE, KLARQUIST & SPARKMAN
ATTORNEYS

United States Patent Office 3,667,801
Patented June 6, 1972

3,667,801
AUTOMOBILE PARTITION APPARATUS HAVING HORIZONTAL SLIDING WINDOW PORTION MOUNTED ON GUARD PLATE
John R. Setina, Rte. 5, P.O. Box 522,
Olympia, Wash. 98501
Continuation-in-part of application Ser. No. 758,947,
Sept. 11, 1968. This application Dec. 18, 1969, Ser.
No. 886,083
Int. Cl. B62d 33/04
U.S. Cl. 296—24 R
10 Claims

ABSTRACT OF THE DISCLOSURE

An automobile partition apparatus is described in which a pair of horizontal sliding partition window portions are mounted on the top of a guard plate extending across the entire width of the automobile adjacent the top of the front seat backrest. The guard plate extends parallel partly down the rear of the front seat backrest to enable such seat to be positioned at different heights. The guard plate and the partition frame are attached between the legs of a roll bar. Locks are provided for locking the partition windows closed which may be unlocked only from the front seat of the automobile. A window guideway is formed integral with the partition frame, including a pair of channels separated by a spacer which allows the two partition windows to to slide across each other in such channels without contacting.

BACKGROUND OF THE INVENTION

The subject matter of the present invention relates generally to partitions for wheeled vehicles and, in particular, to automobile partition apparatus including horizontal sliding partition windows mounted in a partition frame which is fixedly attached in a position contiguous to a guard plate extending across the entire width of the automobile adjacent the top of the front seat backrest. The automobile partition apparatus of the present invention is especially useful in police cars to form a closed compartment with the rear seat which enables prisoners to be confined therein so that they cannot injure the driver in the front seat of such automobile. The present application is a continuation in part of my copending U.S. patent application Ser. No. 758,947, filed Sept. 11, 1968, now Patent No. 3,510,164 and entitled Automobile Partition Apparatus Pivoted on Guard Plate.

The automobile partition apparatus of the present invention has the advantage of not taking up any room in the rear seat because the partition windows merely slide horizontally and are not moved into a lowered position behind the front seat backrest. In addition, by eliminating any need for a pivoting mechanism, the present partition apparatus is much less complicated, has a more reliable operation and is less expensive to manufacture. Furthermore, the present partition apparatus has an advantage over an apparatus using stationary partition windows in that the horizontal sliding windows enable the circulation of air between the front and back seats in their open position.

It has previously been proposed to provide automobile partition apparatus with windows which slide vertically, as shown in U.S. Patent 3,214,211 of J. R. Setina and in U.S. Patent 3,397,005 of V. G. May et al. However, in both of these prior apparatus the partition window is stored in its lower position behind the front seat backrest thereby reducing the leg room in the rear seat, and also requires a mechanism for moving the window from a raised position to a lowered position in which the partition is also sloped.

It is therefore one object of the present invention to provide an improved automobile partition apparatus of simple and inexpensive construction in which a horizontal sliding partition window is employed to provide ventilation without reducing rear seat leg room.

Another object of the invention is to provide such a partition apparatus in which the partition frame is fixedly mounted contiguous to a guard plate extending across the entire width of the automobile adjacent the top of the front seat backrest to prevent objects from being moved beneath the partition.

A further object of the present invention is to provide such a partition apparatus in which the guard plate extends at least partially down the front seat backrest substantially parallel to the rear surface of such backrest to enable the apparatus to be used with front seats of different height.

An additional object of the present invention is to provide such a partition apparatus in which the partition window may be moved between an open position and a closed position in which it is locked to provide a closed compartment in the rear seat by a lock which can only be opened from the front seat.

Still another object of the present invention is to provide such a partition apparatus in which the guard plate and the partition frame are attached between the legs of a roll bar which also supports the roof of the automobile when it overturns.

BRIEF DESCRIPTION OF THE DRAWINGS

Other objects and advantages of the present invention will be apparent from the following detailed description of a preferred embodiment thereof and from the attached drawings of which:

FIG. 1 is a perspective view of the rear of one embodiment of the automobile partition apparatus of the present invention as it is mounted within an automobile;

FIG. 2 is a vertical section view taken along the line 2—2 of FIG. 1 on an enlarged scale;

DESCRIPTION OF THE PREFERRED EMBODIMENTS

Figure 3A:
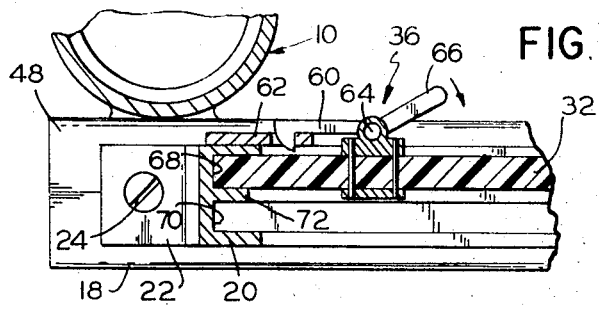
FIGS. 3A and 3B are horizontal section views taken along lines 3A—3A and 3B—3B of FIG. 1.

As shown in FIG. 1, one embodiment of the automobile partition apparatus of the present invention includes a roll bar 10 having a pair of separated vertical leg portions 12 and 14 joined at their upper ends by a horizontal top portion 16. A guard plate member 18 is fixedly attached at its opposite ends to the roll bar legs 12 and 14 in any suitable manner, such as by welding. A partition frame 20 is fixedly mounted contiguous to the top of the guard plate member 18, such as by attaching the bottom of the frame to the guard plate member by a pair of L brackets 22 and associated bolts 24 at the opposite ends of the frame. The top portion of the partition frame 20 is attached to the roll bar by bolts 26 and by another L bracket 28 and associated bolts 30.

A pair of light transparent, unbreakable partition windows 32 and 34 are mounted for horizontal sliding movement on a guideway provided within the partition frame 20. The partition windows slide inwardly to an open position and outwardly to a closed position. The partition windows are locked in the closed position by any suitable lock means, such as a pair of latches 36 and 38 on the outer edge of each of the partition windows, hereafter described with reference to FIGS. 3A and 3B.

As shown in FIG. 2, the guard plate member 18 includes a rear plate portion 40 which extends coplanar substantially parallel to and entirely behind the rear surface of the front seat backrest 42 to enable its use with front seats of different heights, as indicated by arrows 44. The rear portion 40 of the guard plate member 18 forms an acute angle with an upper portion 48 of such guard plate member on which the partition frame 18 is mounted. In addition, the rear portion 40 of the guard plate extends down the front seat backrest for about one-third its height and is free of any aperture which might allow access to the front seat through such rear plate portion. As a result the front seat may be adjusted forwardly in the direction of arrows 46 without creating a gap between such backrest and the guard plate through which the prisoner might poke a knife or other object to harm the driver of the automobile.

A pair of flanges 50 and 52 are provided on the guard plate to enable easier welding to the roll bar legs. A pair of support brackets 54 of expanded metal are attached between the upper portions of the roll bar legs and the door posts of the automobile to hold the roll bar in the proper position. In addition, a pair of floor brackets 56 are provided for attaching the bottom ends of the roll bar legs to the floor. Each bracket 56 has a post projection 58 of slightly smaller diameter than the inner diameter of the roll bar leg which is inserted into such leg, in a similar manner to my copending patent application Ser. No. 758,947.

Figure 3B:
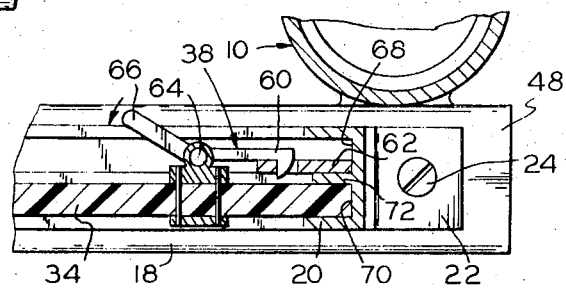

As shown in FIGS. 3A and 3B, the locks 36 and 38 each include a spring biased latch member 60 which engages the edge of an aperture in a latch plate 62 fixedly attached to the partition frame 20, in the closed positions of the partition windows 32 and 34. The latch member 60 is secured to a pivot shaft 64 which is spring biased toward the latch plate 62 by a coil spring (not shown) to enable automatic locking when the partition windows are closed. In order to unlock the locks 36 and 38, a handle portion 66 secured to the pivot shaft 64 of each lock is depressed toward the partition windows thereby releasing the latch member from the latch plate aperture and enabling the partition windows to be slid open. It should be noted that the locks 36 and 38 may be unlocked only from the front side of the partition apparatus because the latch members 60 and handles 66 are provided on such front side. Instead of employing two locks 36 and 38, it is possible to employ a single lock including a latch which is mounted on the top portion of the partition frame 20 and a pair of lock plate openings provided through each of the partition windows which are in alignment in the closed position of such windows so that the latch member can be inserted therethrough. Thus, the single lock may be of the type shown in my copending patent application Ser. No. 758,-947 referred to previously.

The partition frame 20 may be formed of extruded aluminum which provides an integral guideway consisting of a first channel 68 and a second channel 70 which are separated by a spacer rib 72 as shown in FIG. 2. Partition window 32 slides in guide channel 68 and partition window 34 slides in guide channel 70, while the spacer 72 keeps the two partition windows from contacting each other as they slide across one another. This is very important when the partition windows are made of a transparent plastic material, such as methylmethacrylate, sold under the name "Plexiglas." Of course, it is also possible to make the light transparent partition windows out of other material, such as bullet-proof glass or wire mesh.

Figure 4:
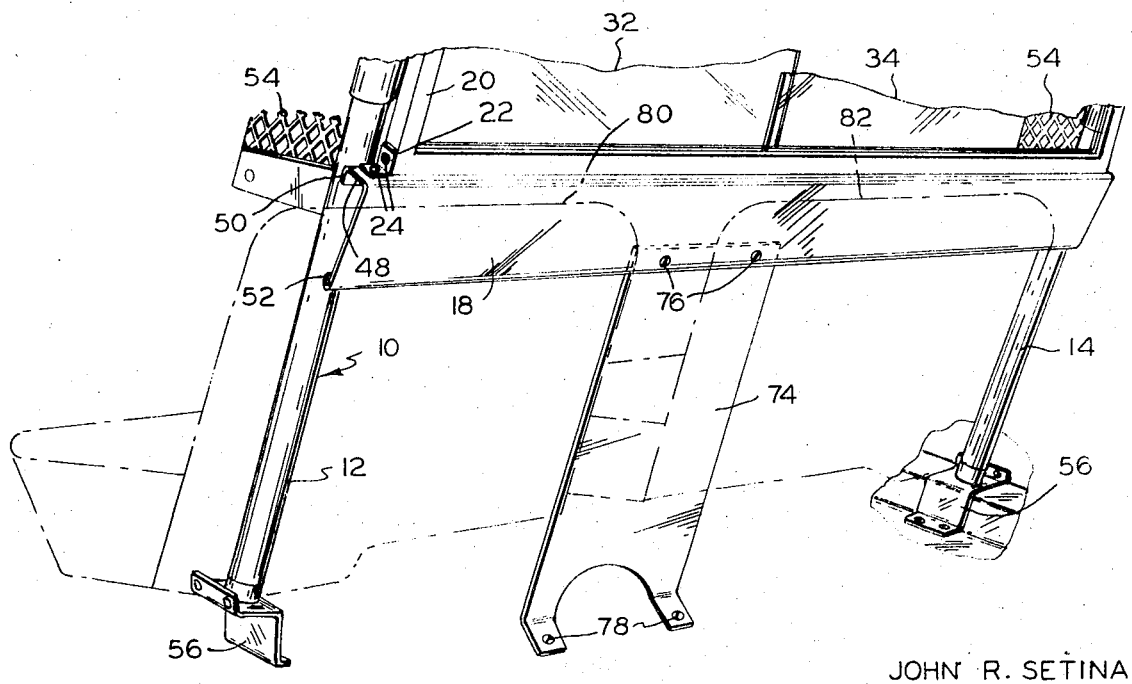
FIG. 4 is a plan perspective view of a portion of the rear of another embodiment of the present invention similar to that of FIG. 1.

As shown in FIG. 4, another embodiment of the automobile partition apparatus of the present invention is similar to that of FIG. 1 but also employs a vertical guard plate member 74 which is attached to the horizontal guard plate member 18 by bolts 76, and is secured to the floor by bolts 78. The purpose of the vertical guard plate member 18 is to cover the space between two backrests 80 and 82 of separate "bucket" type front seats. This feature is also shown in my copending U.S. application Ser. No. 758,947. Of course, the vertical guard plate member 74 extends substantially parallel to the rear surfaces of the front seat backrests and sufficiently overlaps the space between the front seat backrests to enable the seats to be moved into their forwardmost position without creating any appreciable gap between the guard plate and such backrests.

It will be obvious to those having ordinary skill in the art that many changes may be made in the details of the above-described preferred embodiments of the present invention. For example, a single, horizontal sliding partition window can be employed while the other partition window is fixed in position. Also, the roll bar may be eliminated and brackets employed to mount the guard plate and the partition frame on the automobile door posts. In addition, the partition frame need not be mounted on the guard plate member 18, but instead may be attached to the roll bar adjacent to such guard plate. Therefore, the scope of the present invention should only be determined by the following claims.

I claim:
1. Automobile partition apparatus, comprising:
   partition means including at least one light transparent partition window of substantially unbreakable construction movably mounted on a partition frame;
   guard plate means which includes a rear plate portion extending across substantially the entire width of the automobile adjacent the top of the front seat backrest and extending coplanar from the bottom of the partition window at least partially down the rear surface of said backrest, for preventing objects from passing from the back seat to the front seat under the partition means, said rear plate portion being entirely behind the rear surface of the front seat backrest to accommodate backrests of different heights and being free of any aperture allowing access to the front seat;
   roll bar means adapted to be fixedly attached to the floor of the automobile for supporting the roof of the automobile when it overturns; and
   support means for fixedly mounting said partition frame on said roll bar contiguous to said guard plate and for enabling horizontal sliding movement of the partition window between an open position and a closed position so that said partition means closes the space between the top of the guard plate and the roof of the automobile in the closed position of said partition window.
2. Partition apparatus in accordance with claim 1 in which the movable partition includes a pair of partition window portions which are both mounted for horizontal sliding movement.
3. Partition apparatus in accordance with claim 1 which also includes lock means for locking the partition window in the closed position and which can be unlocked only from the front side of the partition window.
4. Partition apparatus in accordance with claim 1 in which the rear plate portion extends at an angle substantially parallel to the rear surface of the front seat backrest.
5. Partition apparatus in accordance with claim 1 in which the roll bar means includes a pair of leg portions and a top portion extending between the upper ends of said leg portions, and the guard plate means is attached between said pair of leg portions.
6. Partition apparatus in accordance with claim 5 in which the support means fixedly attaches the partition frame to the guard plate means and to at least the top portion of the roll bar.
7. Partition apparatus in accordance with claim 6 in which the movable partition window includes a pair of partition window portions which are both mounted in a guideway on said partition frame for horizontal sliding movement.
8. Partition apparatus in accordance with claim 7 in which a pair of lock means are provided on each of the pair of partition window portions for locking said partition portions to the partition frame in the closed position, said lock means being capable of being unlocked only from the front side of the partition means.

9. Partition apparatus in accordance with claim 7 in which the partition frame is made of extruded metal so that a guideway is formed integral with said frame, said guideway including first and second guide channels in which the partition window portions are mounted, and spacer means for separating the first and second channels to enable the partition window portions to slide across each other without contacting.

10. Partition apparatus in accordance with claim 6 in which the guard plate means includes a rear portion extending substantially parallel to the rear surface of the backrest of the front seat, and an upper portion extending at an acute angle from the top of said rear portion above the top of said backrest, said partition frame being attached to said upper portion.

References Cited

UNITED STATES PATENTS

| | | | |
|---|---|---|---|
| 3,397,005 | 8/1968 | May et al. | 296—24 |
| 3,469,090 | 9/1969 | Redus | 296—24 |
| 3,441,309 | 4/1969 | Halstead et al. | 296—24 |

BENJAMIN HERSH, Primary Examiner

R. R. SONG, Assistant Examiner